(12) United States Patent
Choi et al.

(10) Patent No.: US 8,800,502 B2
(45) Date of Patent: Aug. 12, 2014

(54) HEAT STORAGE DEVICE OF VEHICLE

(75) Inventors: Yong Hyun Choi, Hwaseong-si (KR); Yong Chul Kim, Hwaseong-si (KR); June Kyu Park, Hwaseong-si (KR); Jungha Park, Gunpo-si (KR); Man Hee Park, Suwon-si (KR); Ki-hyung Lee, Ansan-si (KR); Jung-wook Son, Ansan-si (KR)

(73) Assignees: Hyundai Motor Company, Seoul (KR); Industry-University Cooperation Foundation Hanyang University Erica Campus, An San-Si (KR)

( * ) Notice: Subject to any disclaimer, the term of this patent is extended or adjusted under 35 U.S.C. 154(b) by 141 days.

(21) Appl. No.: 13/532,440

(22) Filed: Jun. 25, 2012

(65) Prior Publication Data

US 2013/0146000 A1  Jun. 13, 2013

(30) Foreign Application Priority Data

Dec. 9, 2011 (KR) .......................... 10-2011-0132284

(51) Int. Cl.
*F01P 11/00* (2006.01)

(52) U.S. Cl.
CPC ...................................... *F01P 11/00* (2013.01)
USPC .................. 123/41.14; 123/41.15; 123/41.02; 123/41.44; 123/198 D (58) Field of Classification Search
CPC ............................. F01P 11/00; F01P 2011/205
USPC ........... 123/41.14, 41.15, 41.02, 41.01, 41.44
See application file for complete search history.

(56) References Cited

U.S. PATENT DOCUMENTS

| | | | | |
|---|---|---|---|---|
| 5,372,011 A | * | 12/1994 | O'Neal | 62/93 |
| 5,553,662 A | * | 9/1996 | Longardner et al. | 165/202 |
| 5,927,381 A | * | 7/1999 | Bednarek et al. | 165/41 |
| 7,147,071 B2 | * | 12/2006 | Gering et al. | 237/12.3 B |
| 8,220,284 B2 | * | 7/2012 | Tsubone | 62/324.4 |
| 2008/0078542 A1 | * | 4/2008 | Gering et al. | 165/202 |
| 2009/0194257 A1 | * | 8/2009 | Niu et al. | 165/104.17 |
| 2010/0126437 A1 | * | 5/2010 | Riedel et al. | 123/41.14 |
| 2010/0186685 A1 | * | 7/2010 | Hiyama | 123/41.08 |
| 2011/0232890 A9 | * | 9/2011 | Gering et al. | 165/202 |

FOREIGN PATENT DOCUMENTS

| | | |
|---|---|---|
| JP | 06-108043 A | 4/1994 |
| JP | 2006-232006 A | 9/2006 |
| JP | 2006-299850 A | 11/2006 |
| KR | 10-2011-0066024 A | 6/2011 |

* cited by examiner

*Primary Examiner* — Noah Kamen
*Assistant Examiner* — Grant Moubry
(74) *Attorney, Agent, or Firm* — Morgan, Lewis & Bockius LLP (57) ABSTRACT

A heat storage device of a vehicle may include an insulation container, a coolant passage connected to an engine, a heat exchanger having a fin formed on the coolant passage inside the insulation container, a phase change material charged in the insulation container to exchange heat with flowing coolant, a phase change material temperature sensor, a pressure sensor, an engine coolant temperature sensor, and a control portion that circulates the coolant according to the driving condition of the engine and the coolant temperature such that the coolant exchanges heat with the phase change material. Accordingly, fuel for warming an engine or heating an interior room is reduced, a separate heating device or a warm up device such as a PTC heater can be replaced, quality of the exhaust gas is quickly improved, and there is a merit in overcoming environmental regulations.

15 Claims, 6 Drawing Sheets

HEAT STORAGE DEVICE OF VEHICLE

CROSS-REFERENCE TO RELATED APPLICATION

The present application claims priority of Korean Patent Application Number 10-2011-0132284 filed Dec. 9, 2011, the entire contents of which application is incorporated herein for all purposes by this reference.

BACKGROUND OF INVENTION

1. Field of Invention

The present invention relates to a heat storage device of a vehicle that stores heat of a coolant in a phase change material when the coolant temperature is high, and uses the stored heat to heat the coolant when the coolant temperature is low.

2. Description of Related Art

Generally, the heat energy of a coolant is exhausted outside through a radiator of a vehicle, wherein about 30% of total energy is lost through heat to increase fuel consumption and to destroy the environment.

Accordingly, a heat storage system for a vehicle, which stores heat energy of a vehicle and exhausts the stored energy, is being researched.

In the vehicle heat energy storage system, it is hard to store heat, considering its volume, complexity, weight, and heat storage amount. Also, a chemical heat storage method is excluded in the research, because the chemical material can be discharged in a traffic accident.

An ice heat storage method in a latent heat storage method has features that weight and volume are large, and heat storage time is short, which is not appropriate for a vehicle generating a high temperature.

Accordingly, research on a latent heat storage method using a phase change material having a high heat storage capacity has been being actively undertaken.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a heat storage device of a vehicle having advantages of using heat energy that is stored in a phase change material to effectively heat a coolant when the coolant temperature is low and effectively managing a failsafe mode condition such as an overheat or overpressure condition of the phase change material.

Various aspects of the present invention provide for heat storage device of a vehicle that may include an insulation container in which an outlet and an inlet are formed, a coolant passage that is disposed to penetrate the inlet and the outlet, wherein one end thereof is connected to a coolant outlet of an engine and the other end thereof is connected to a coolant outlet of the engine, a heat exchanger that includes a fin that is formed on the coolant passage inside the insulation container, a phase change material that is charged in the insulation container to exchange heat with coolant flowing in the coolant passage through the fin, a phase change material temperature sensor that detects a temperature of the phase change material that is charged in the insulation container, a pressure sensor that detects a pressure inside the insulation container, an engine coolant temperature sensor that detects a temperature of coolant circulating in the engine, and a control portion that circulates the coolant through the coolant passage according to the driving condition of the engine and the coolant temperature such that the coolant exchanges heat with the phase change material.

A bypass line may be formed on the coolant passage to bypass the insulation container, and an inlet valve and an outlet valve may be respectively disposed at a point that the bypass line is diverged from the coolant passage and at a point that the bypass line joins the coolant passage.

An outlet temperature sensor may be disposed at a downstream side of the outlet valve to detect a temperature of coolant that is exhausted through the outlet of the insulation container, and an inlet temperature sensor may be disposed at an upstream side of the inlet valve to detect a temperature of coolant that flows therein through the inlet of the insulation container.

The heat storage device of a vehicle may further include a heater core that uses coolant flowing in the coolant passage to heat an interior room, and a heater core supply valve that selectively supplies coolant from the coolant passage to the heater core.

If the temperature of the engine coolant that is detected by the engine coolant temperature sensor is less than a first predetermined value, the control portion may determine that it is in a cold state, close the heater core supply valve, and control the inlet valve and the outlet valve such that the coolant of the coolant passage flows through the heat exchanger to be heated by the phase change material.

If the coolant temperature of the engine that is detected by the engine coolant temperature sensor is between the first predetermined value and a second predetermined value, the control portion may determine that it is in a warm-up middle condition, open the heater core supply valve, and control the inlet valve and the outlet valve to heat the coolant by using the heat of the heater core.

If the coolant temperature of the engine that is detected by the engine coolant temperature sensor reaches the second predetermined value, the control portion may determine that it is in a warm-up condition, open the heater core supply valve, and control the inlet valve and the outlet valve such that the coolant of the coolant passage flows in the bypass line.

If the coolant temperature of the engine that is detected by the engine coolant temperature sensor reaches a third predetermined value that is higher than the second predetermined value, the control portion may determine that it is in an overly warm condition, open the heater core supply valve, and control the inlet valve and the outlet valve such that the coolant of the coolant passage flows in the heat exchanger to make the coolant heat the phase change material.

If the engine is turned off, the control portion may control the inlet valve and the outlet valve such that the heat energy stored in the phase change material cannot be exhausted outside through the coolant.

The control portion may enter into a failsafe mode when the difference between the coolant temperature that is detected by the inlet temperature sensor and the coolant temperature that is detected by the outlet temperature sensor is less than a predetermined value based on the temperature of the phase change material that is detected by the phase change material temperature sensor.

The control portion may enter into a failsafe mode if the rising speed of the temperature of the phase change material that is detected by the phase change material temperature sensor exceeds a predetermined value, or the rising speed of the pressure of the phase change material that is detected by the pressure sensor exceeds a predetermined value.

The control portion may enter into a failsafe mode if the temperature of the phase change material that is detected by the phase change material temperature sensor is less than a predetermined value.

The control portion may enter into a failsafe mode if the variation speed of the temperature of the phase change material that is detected by the phase change material temperature sensor exceeds a predetermined value, or the variation speed of the pressure of the phase change material that is detected by the phase change material pressure sensor exceeds a predetermined value.

If the control portion enters into a failsafe mode, the control portion may light an emergency lamp of a cluster and control the inlet valve and the outlet valve such that the coolant is not supplied to the coolant passage inside the insulation container but is supplied to the bypass line.

In accordance with various aspects of the present invention, a fuel consumption amount for warming an engine or heating an interior room is saved, a separate heating device or a warm up device such as a PTC heater can be replaced, quality of the exhaust gas is quickly improved, fuel consumption amount is reduced, and there is a merit in overcoming environmental regulations.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
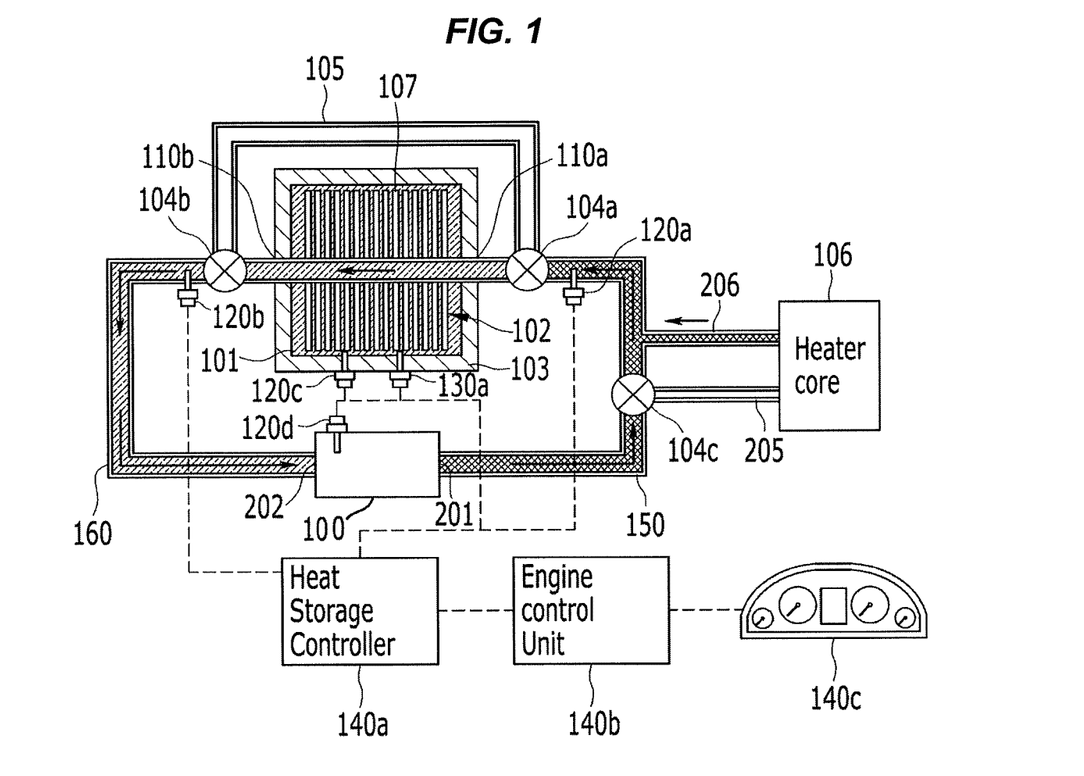
FIG. 1 is a schematic diagram showing an operational state of an exemplary heat storage device of a vehicle in a condition that a coolant temperature is low according to the present invention.

FIG. 1 is a schematic diagram showing an operational state of a heat storage device of a vehicle in a condition that a coolant temperature is low according to various embodiments of the present invention.

Referring to FIG. 1, a heat storage device of a vehicle includes an engine 100, a phase change material 101, a heat exchanger 102, an insulation container 103, an inlet valve 104a, an outlet valve 104b, a heater core supply valve 104c, a bypass line 105, a heater core 106, a fin 107, an inlet 110a, an outlet 110b, an inlet temperature sensor 120a, an outlet temperature sensor 120b, a phase change material temperature sensor 120c, an engine coolant temperature sensor 120d, a pressure sensor 130a, a heat storage control portion 140a, an engine control portion 140b, a cluster 140c, a coolant exhaust line 150, a coolant supply line 160, a coolant outlet 201, a coolant inlet 202, a first heater core line 205, and a second heater core line 206.

The coolant outlet 201 and the coolant inlet 202 are formed on the engine 100, the coolant passages 150 and 160 are formed from the coolant outlet 201 to the coolant inlet 202, and the coolant passages 150 and 160 include the coolant exhaust line 150 and the coolant supply line 160.

The coolant exhaust line 150 is formed from the coolant outlet 201 as a start point of the coolant passage 150 and 160, and the first heater core line 205 is diverged from the coolant exhaust line 150 to supply the heater core 106 with coolant.

The heater core valve 104c is disposed at a point that the first heater core line 205 is diverged. The heater core valve 104c selectively supplies the heater core 106 with coolant that flows in the coolant exhaust line 150. Further, the second heater core line 206 is formed such that the coolant passing the heater core 106 returns to the coolant passage.

The inlet 110a and the outlet 110b are formed in the insulation container 103 and the coolant passage 150 and 160 is disposed through the inlet 110a and the outlet 110b.

The fin 107 is formed along an exterior circumference of the coolant passages 150 and 160 in the insulation container 103, and the phase change material 101 is charged between the inside of the insulation container 103 and the fin 107 without a gap. Here, the fin 107 effectively transfers heat from the coolant flowing in the coolant passage 150 and 160 to the phase change material 101 that is charged in the insulation container 103, and vice versa.

The phase change material temperature sensor 120c detecting the temperature of the phase change material 101 is disposed on the insulation container 103, and the pressure sensor 130a is disposed to detect the pressure of the phase change material 101. Further, the engine coolant temperature sensor 120d is disposed on the engine 100 to detect the temperature of the coolant circulating in the engine 100.

The bypass line 105 is diverged from the coolant passage at an upstream side of the inlet 110a of the insulation container 103 to be joined with the coolant passage 150 of a downstream side of the outlet 110b.

The inlet valve 104a is disposed at a point that the bypass line 105 is diverged from the coolant passages 150 and 160, and the outlet valve 104b is disposed at a point that the bypass line 105 joins the coolant passage 150.

The inlet temperature sensor 120a that detects the coolant temperature flowing into the insulation container 103 is disposed on the coolant passages 150 and 160 of an upstream side of the inlet valve 104a, and the outlet temperature sensor 120b that detects the coolant temperature exhausted from the insulation container 103 is disposed on the coolant passage 150 and 160 at a downstream side of the outlet valve 104*b*.

The heat storage control portion 140*a* uses the coolant temperature that is detected by the engine coolant temperature sensor 120*d*, the inlet temperature sensor 120*a*, the pressure sensor 130*a*, the phase change material temperature sensor 120*c*, and the outlet temperature sensor 120*b* to control the heater core supply valve 104*c*, the inlet valve 104*a*, and the outlet valve 104*b*.

A radiator and a thermostat are otherwise conventional and therefore a detailed description thereof will be omitted. Further, another vehicle that is not described in the present invention could be referred to in the disclosed document.

The heat storage control portion 140*a* and the engine control portion 140*b* can be described as control portions in various embodiments of the present invention.

If it is determined that the coolant temperature of the engine 100 is less than a first predetermined value, the control portions 140*a* and 140*b* do not supply the heater core 106 with coolant. The reason thereof is to prevent heat energy from being emitted by the heater core 106.

Further, the control portions 140*a* and 140*b* control the inlet valve 104*a* and the outlet valve 104*b* such that the coolant is supplied to the coolant passage 150 and 160 of the insulation container 103 and is not supplied to the bypass line 105.

The coolant that flows through the coolant passages 150 and 160 in the insulation container 103 through the inlet valve 104*a* absorbs the heat energy from the phase change material through the fin 107 to be supplied to the engine 100 through the coolant supply line 160.

Figure 2:
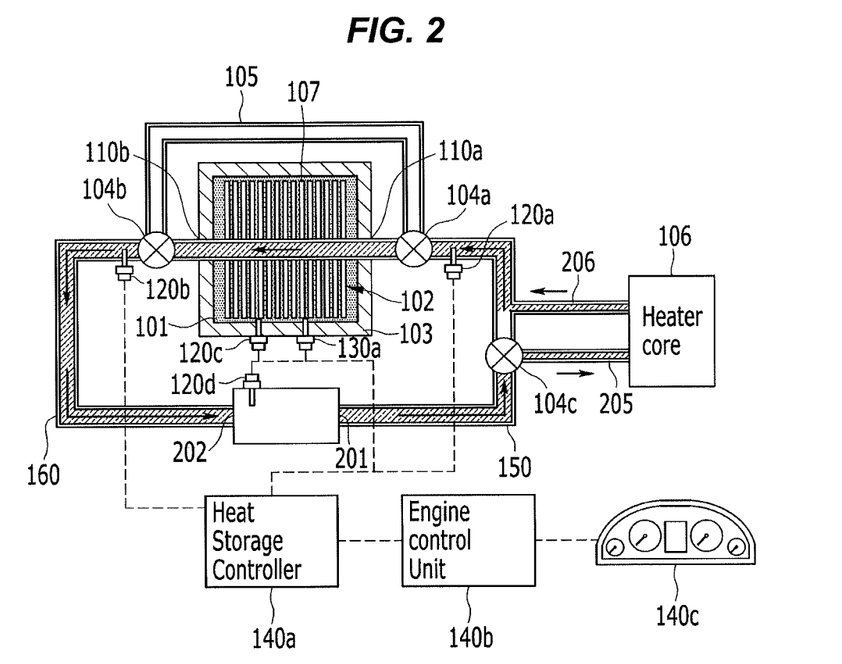
FIG. 2 is a schematic diagram showing an operational state of an exemplary heat storage device of a vehicle in a condition that a coolant temperature rises according to the present invention.

FIG. 2 is a schematic diagram showing an operational state of a heat storage device of a vehicle in a condition that a coolant temperature rises according to various embodiments of the present invention.

Referring to FIG. 2, if it is determined that the coolant circulating the engine 100 ranges from the first predetermined value to the second predetermined value, the control portions 140*a* and 140*b* open the heater core supply valve 104*c* such that the coolant heated by the heater core 106 is supplied to heat the interior air or the interior heat energy is supplied to the coolant.

Figure 3:
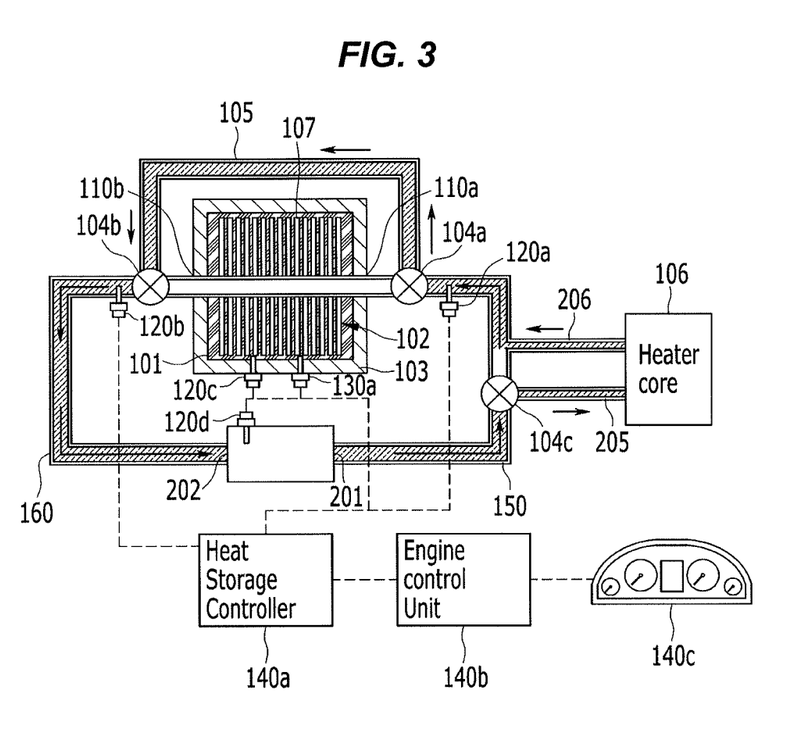
FIG. 3 is a schematic diagram showing an operational state of an exemplary heat storage device of a vehicle in a condition that a coolant temperature has risen according to the present invention.

FIG. 3 is a schematic diagram showing an operational state of a heat storage device of a vehicle in a condition that a coolant temperature has risen according to various embodiments of the present invention.

Referring to FIG. 3, if the coolant circulating the engine 100 reaches the second predetermined value, the control portions 140*a* and 140*b* determine that the engine 100 is warmed up and controls the inlet valve 104*a* and the outlet valve 104*b* such that the coolant is not supplied to the coolant passage in the insulation container 103 but is supplied to the bypass line 105. In this condition, the temperature of the phase change material 101 becomes less than the coolant temperature.

Figure 4:
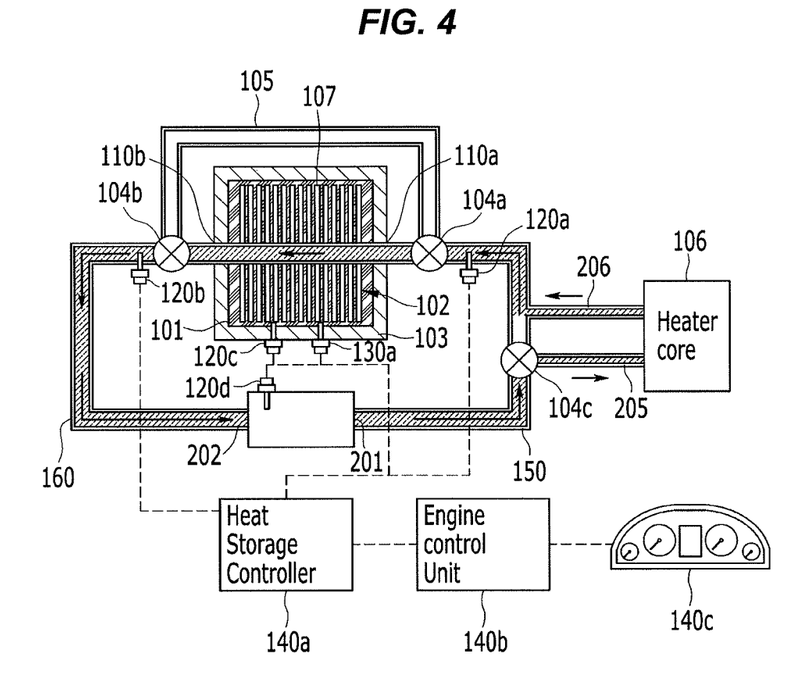
FIG. 4 is a schematic diagram showing an operational state of an exemplary heat storage device of a vehicle in a condition that a coolant temperature has further risen according to the present invention.

FIG. 4 is a schematic diagram showing an operational state of a heat storage device of a vehicle in a condition that a coolant temperature has further risen according to various embodiments of the present invention.

Referring to FIG. 4, if the temperature of the coolant circulating in the engine 100 reaches a third predetermined value or a thermostat is opened and a radiator fan is operated, the control portions 140*a* and 140*b* determine that the engine 100 is overly warmed up or overheated and controls the inlet valve 104*a* and the outlet valve 104*b* such that the coolant is supplied to the coolant passage of the inside of the insulation container 103 and the bypass line 105 is closed.

Accordingly, the heat energy of the overheated coolant is effectively stored in the phase change material.

Figure 5:
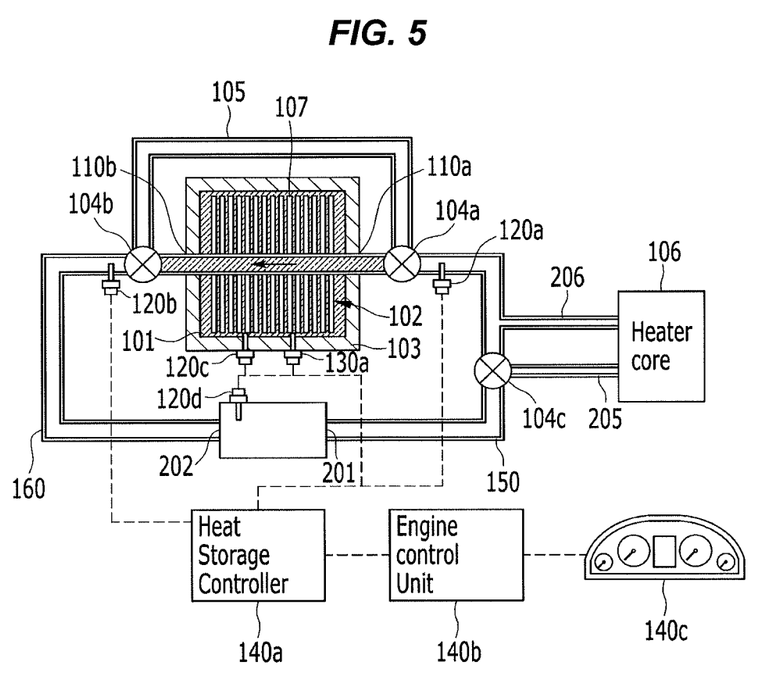
FIG. 5 is a schematic diagram showing an operational state of an exemplary heat storage device of a vehicle in a condition that an engine stops its operation according to the present invention.

FIG. 5 is a schematic diagram showing an operational state of a heat storage device of a vehicle in a condition that an engine stops its operation according to various embodiments of the present invention.

Referring to FIG. 5, if the engine 100 stops operating, the control portions 140*a* and 140*b* control the inlet valve 104*a* and the outlet valve 104*b* such that the coolant is not circulated through the insulation container 103 and the heat energy stored in the phase change material 101 is not lost.

Figure 6:
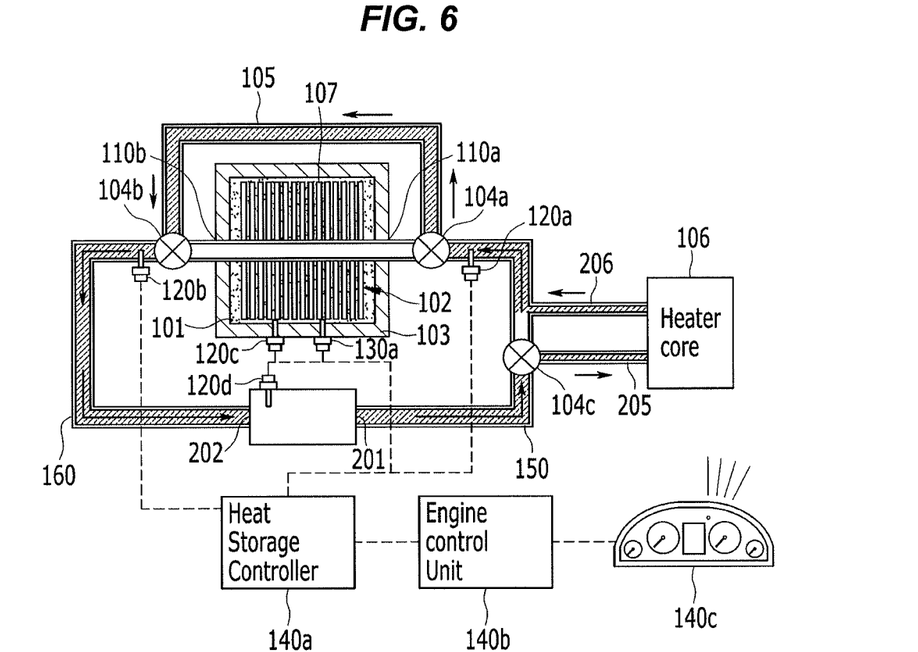
FIG. 6 is a schematic diagram showing an operational state of an exemplary heat storage device of a vehicle in a condition that an engine enters into a failsafe mode according to the present invention.

FIG. 6 is a schematic diagram showing an operational state of a heat storage device of a vehicle in a condition that an engine enters into a failsafe mode according to various embodiments of the present invention.

When the difference between the coolant temperature that is detected by the inlet temperature sensor 120*a* and the coolant temperature that is detected by the outlet temperature sensor 120*b* is excessively small based on the temperature of the phase change material 101 that is detected by the phase change material temperature sensor 120*c*, the system enters into a failsafe mode to light an emergency lamp on the cluster 140*c*.

Or, if the temperature of the phase change material 101 that is detected by the phase change material temperature sensor 120*c* is excessively high or the pressure of the phase change material 101 that is detected by the pressure sensor 130*a* is excessively high, the system enters into a failsafe mode to light a warming lamp on the cluster 140*c*.

Or, if the temperature of the phase change material 101 that is detected by the phase change material temperature sensor 120*c* is excessively low, the system enters into a failsafe mode to light a warning lamp on the cluster 140*c*.

Or, if the temperature of the phase change material 101 that is detected by the phase change material temperature sensor 120*c* is excessively fluctuated or the pressure of the phase change material 101 that is detected by the pressure sensor 130*a* is excessively fluctuated, the system enters into a failsafe mode to light a warning lamp on the cluster 140*c*.

Referring to FIG. 6, as described above, if the system enters into the failsafe mode, the control portion controls the inlet valve 104*a* and the outlet valve 104*b* such that the coolant is not supplied to the coolant passages 150 and 160 of the inside of the insulation container 103 and circulate in the bypass line 105.

The phase change material according to various embodiments of the present invention can include stearic acid. Accordingly, a fuel that is used to warm up the engine or to heat interior room is saved, a separate heating device or a warm-up device such as a PTC heater can be replaced thereby, and quality of the exhaust gas is quickly improved so there is a merit of protecting the environment.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat storage device of a vehicle, comprising:
an insulation container in which an outlet and an inlet are formed;
a coolant passage disposed to penetrate the inlet and the outlet, wherein opposing ends of the coolant passage are fluidly connected to coolant outlets of a vehicle engine;
a heat exchanger that includes a fin formed on the coolant passage inside the insulation container;
a phase change material that is charged in the insulation container to exchange heat with coolant flowing in the coolant passage through the fin;
a phase change material temperature sensor that detects a temperature of the phase change material within the insulation container;
a pressure sensor that detects a pressure inside the insulation container;
an engine coolant temperature sensor that detects a temperature of coolant circulating in the engine; and
a control portion that circulates the coolant through the coolant passage according to a driving condition of the engine and the coolant temperature such that the coolant exchanges heat with the phase change material;
wherein a bypass line is fluidly connected to the coolant passage to bypass the insulation container, and an inlet valve and an outlet valve are disposed to divert coolant passage around the insulation container; and
wherein an outlet temperature sensor is disposed downstream of the outlet valve to detect a temperature of coolant exhausted through the outlet of the insulation container, and an inlet temperature sensor is disposed upstream of the inlet valve to detect a temperature of coolant that flows therein through the inlet of the insulation container.

2. The heat storage device of a vehicle of claim 1, further comprising:
a heater core that uses coolant flowing in the coolant passage to heat an interior compartment; and
a heater core supply valve that selectively supplies coolant from the coolant passage to the heater core.

3. The heat storage device of a vehicle of claim 2, wherein if the temperature of the engine coolant detected by the engine coolant temperature sensor is less than a first predetermined value, the control portion determines that it is in a cold state, closes the heater core supply valve, and controls the inlet valve and the outlet valve such that the coolant of the coolant passage flows through the heat exchanger to be heated by the phase change material.

4. The heat storage device of a vehicle of claim 2, wherein if the coolant temperature of the engine detected by the engine coolant temperature sensor is between the first predetermined value and a second predetermined value, the control portion determines that it is in a warm-up middle condition, opens the heater core supply valve, and control the inlet valve and the outlet valve to heat the coolant by using the heat of the heater core.

5. The heat storage device of a vehicle of claim 2, wherein if the coolant temperature of the engine detected by the engine coolant temperature sensor reaches the second predetermined value, the control portion determines that it is in a warm-up condition, opens the heater core supply valve, and controls the inlet valve and the outlet valve such that the coolant of the coolant passage flows in the bypass line.

6. The heat storage device of a vehicle of claim 2, wherein if the coolant temperature of the engine detected by the engine coolant temperature sensor reaches a third predetermined value higher than the second predetermined value, the control portion determines that it is in an overly warm condition, opens the heater core supply valve, and controls the inlet valve and the outlet valve such that the coolant of the coolant passage flows in the heat exchanger to make the coolant heat the phase change material.

7. The heat storage device of a vehicle of claim 2, wherein if the engine is turned off, the control portion controls the inlet valve and the outlet valve such that the heat energy stored in the phase change material cannot be exhausted outside through the coolant.

8. The heat storage device of a vehicle of claim 1, wherein the control portion enters into a failsafe mode when the difference between the coolant temperature detected by the inlet temperature sensor and the coolant temperature detected by the outlet temperature sensor is less than a predetermined value based on the temperature of the phase change material detected by the phase change material temperature sensor.

9. The heat storage device of a vehicle of claim 8, wherein if the control portion enters into a failsafe mode,
the control portion lights an emergency lamp of a cluster and controls the inlet valve and the outlet valve such that the coolant is not supplied to the coolant passage inside the insulation container but is supplied to the bypass line.

10. The heat storage device of a vehicle of claim 1, wherein the control portion enters into a failsafe mode if the rising speed of the temperature of the phase change material detected by the phase change material temperature sensor exceeds a predetermined value, or the rising speed of the pressure of the phase change material detected by the pressure sensor exceeds a predetermined value.

11. The heat storage device of a vehicle of claim 10, wherein if the control portion enters into a failsafe mode,
the control portion lights an emergency lamp of a cluster and controls the inlet valve and the outlet valve such that the coolant is not supplied to the coolant passage inside the insulation container but is supplied to the bypass line.

12. The heat storage device of a vehicle of claim 1, wherein the control portion enters into a failsafe mode if the temperature of the phase change material detected by the phase change material temperature sensor is less than a predetermined value.

13. The heat storage device of a vehicle of claim 12, wherein if the control portion enters into a failsafe mode,
the control portion lights an emergency lamp of a cluster and controls the inlet valve and the outlet valve such that the coolant is not supplied to the coolant passage inside the insulation container but is supplied to the bypass line.

14. The heat storage device of a vehicle of claim 1, wherein the control portion enters into a failsafe mode if the variation speed of the temperature of the phase change material detected by the phase change material temperature sensor exceeds a predetermined value, or the variation speed of the pressure of the phase change material detected by the phase change material pressure sensor exceeds a predetermined value.

15. The heat storage device of a vehicle of claim 14, wherein if the control portion enters into a failsafe mode,
the control portion lights an emergency lamp of a cluster and controls the inlet valve and the outlet valve such that the coolant is not supplied to the coolant passage inside the insulation container but is supplied to the bypass line.

\* \* \* \* \*